United States Patent [19]
Allen et al.

[11] Patent Number: 5,300,206
[45] Date of Patent: Apr. 5, 1994

[54] ANTIPERCOLATION GAS-DIFFUSION ELECTRODE AND METHOD OF MAKING SAME

[75] Inventors: Robert J. Allen, Saugus; Ravindra J. Vora, Framingham; Michael De Marinis, Milford, all of Mass.

[73] Assignee: Metallgesellschaft AG, Frankfurt am Main, Fed. Rep. of Germany

[21] Appl. No.: 924,094

[22] Filed: Aug. 3, 1992

[51] Int. Cl.⁵ .............. C25B 11/04; C09J 5/10
[52] U.S. Cl. .............. 204/284; 204/290 R; 429/42; 429/44; 427/77; 427/113; 427/384; 427/402; 427/407.1; 156/306.6; 156/308.6
[58] Field of Search .......... 204/290 R, 284; 429/40, 429/44, 42; 427/77, 113, 402, 407.1, 375, 384; 156/306.6, 306.9, 306.2, 306.6

[56] References Cited
U.S. PATENT DOCUMENTS

| | | | |
|---|---|---|---|
| 3,899,354 | 8/1975 | Kordesch | 429/42 |
| 4,756,981 | 7/1988 | Breault et al. | 429/185 |
| 5,133,842 | 7/1992 | Taylor et al. | 204/290 R |

FOREIGN PATENT DOCUMENTS

0050845 4/1979 Japan .................. 429/42

Primary Examiner—Kathryn Gorgos
Attorney, Agent, or Firm—Herbert Dubno

[57] ABSTRACT

A gas diffusion electrode is provided with antipercolation coating by bonding a free-standing film, e.g. of polysulfone or polypropylene, to a catalyzed carbon cloth utilizing a filled polysulfone/N-MP adhesive which is subjected to solvent exchange with water by either a thermal bonding as in the case of a free-standing microporous polysulfone film or mechanical bonding as in the case of a commercial microporous polypropylene film.

22 Claims, 5 Drawing Sheets

ANTIPERCOLATION GAS-DIFFUSION ELECTRODE AND METHOD OF MAKING SAME

FIELD OF THE INVENTION

Our present invention relates to gas-diffusion electrodes and to a method of making same. More particularly, this invention relates to antipercolation gas-diffusion electrodes, i.e. gas diffusion electrodes whose gas-permeable body may be provided with an antipercolation coating or layer to prevent gas leakage to the electrolyte when pressurizing said gas to prevent flooding of the gas plenum with the electrolyte in contact with the electrode. The invention also, therefore, relates to the method of applying the antipercolation layer to such body.

BACKGROUND OF THE INVENTION

A gas-diffusion electrode can comprise a semihydrophobic deposit of catalyzed high surface area carbon and fluorocarbon which is thermally sintered onto or into a planar substrate which may be carbon cloth, carbon paper or a metallic mesh or expanded metal. With respect to the principles of such electrodes, reference may be had to U.S. Pat. Nos. 4,614,575 and 5,047,133.

It is important with gas-diffusion electrodes to ensure a gas permeability of the body of the electrode which is such that electrolytes can enter the body only to a limited degree, to thereby avoid flooding of the pores of the body and any plenum, or other gas-diffusion system associated therewith.

By and large, one side of the body is supplied with gas while the other side faces the electrolyte, and it is common with such electrodes, especially when a free-flowing electrolyte is used and the electrode is immersed in the electrolyte to a considerable depth, to find it necessary to provide an antipercolation coating to prevent gas percolation losses to the electrolyte with a substantial reduction in electrochemical performance and gas economy.

In some cases, such percolation losses can be avoided by immobilizing the electrolyte by absorption into matrices or absorbent separators between electrodes.

Where the electrolyte, however, is capable of free flow, reacting gases can be prevented from migrating through the electrode by the capillary forces present where the electrolyte permeates the porous body. Where the balance between gas flow and electrolyte penetration is disrupted, the gas can percolate through the body without reacting or the electrolyte can pass through the body and flood the gas plenum or other distribution system and both the gas economy and electrochemical performance are adversely affected.

At small immersion depths, up to approximately 20 cm, the disruption by high reactant gas pressure or high electrolyte pressure is generally not a severe problem. However, as depth increases, the electrolyte tends to flood increasingly through the electrode to the gas plenum unless offset by gas pressure.

This danger can be combatted by compartmentalizing the electrode and controlling the isolated compartments so that they are of different gas pressures designed to resist penetration of the electrolyte through the porous body. This is costly and requires complicated engineering. Another method provides the gas-diffusion electrode with a microporous coating at the electrolyte side to allow fresh electrolyte wetting to carry the current, but restricts reactant gas percolation even at very high gas pressures. Such a coating allows construction of relatively low cost single compartment electrodes and allows more wide-spread use of gas-diffusion electrodes even in processes which have been able heretofore to use only solid electrodes.

There are two principal modes of use of gas-diffusion electrodes. In one mode, they are gasket-sealed into plate and frame electrolyzers which have a specific plenum for the supply of feed gas. In the second mode, they are laminated onto metal sheet substrates for use in immersed-tank electrolytic processes. In the latter case, the edges of the electrodes must be sealed to prevent gas leakage. In both cases, the antipercolation coatings are necessary where deep immersion in the electrolyte may be required.

Gas-diffusion electrodes with which the invention are primarily concerned are hydrogen-diffusion anodes, although the invention is also applicable to gas-diffusion cathodes. Hydrogen-diffusion anodes operate at electrode potentials which allow the use of a wide range of substrate and coating materials. Electrodes for oxygen reduction operate at much higher (oxidizing) potentials which can impose limitations on the materials used.

Improved immersed tank-type electrodes for application in the retrofitting of industrial electrolysis processes where the electrodes are required to operate at significant electrolyte depths have been developed. Such applications include replacing oxygen evolution as the anodic process in the electrowinning of metals such as zinc, copper and manganese. In such applications, hydrogen-diffusion electrodes must be typically immersed in an electrolyte in depths up to 6 feet and a traditional problem in such systems is that the feed gas can escape through the electrode structure into the electrolyte and/or the electrolyte will intrude through the electrode structure and flood the gas supply plenum. Experience has shown that, in many cases, only the top of the electrode, where the hydraulic pressure is the least, remains functional. Gas-diffusion electrodes of this latter type are described in U.S. Pat. No. 5,047,133.

In practice, full-scale industrial gas-diffusion anodes, laminated and sealed with conductive epoxy to metallic sheets, have been made in accordance with the teachings of this U.S. Pat. No. 5,047,133. Here the reactant gas is exclusively supplied over large electrode surface areas without any special plenum but by distribution directly through the carbon cloth.

In this earlier system, an anode percolation layer was coated onto the cloth which was bonded with conductive epoxy to a solid metal support. After the epoxy is applied to the substrate by screening to control thickness, the carbon cloth is applied and held in place by a vacuum bagging technique allowing a constant and uniform pressure to be applied during high-temperature curing of the epoxy.

Gas flow is through the cloth and between the epoxy (which intrudes into the cloth only to a limited extent) and the catalyst layer which also penetrates only to a limited extent into the cloth.

In the past, the antipercolation layers which have been used have not been fully satisfactory. In general, prior art antipercolation coatings for carbon-cloth diffusion layers of gas-diffusion electrodes were not entirely satisfactory.

As a practical matter, an antipercolation coating must have sufficient adhesion to catalyzed carbon cloth to overcome internal pressures which might tend to separate the antipercolation coating from the cloth and must provide acceptable gas retention, i.e. be free from pin holes. It must be stable in acid and/or base and in low concentrations of oxidizing agents and have good wettability with aqueous electrolytes and good ionic conductivity. The antipercolation coating also should show dimensional stability on hydration/dehydration and should form reliable bonds with conventional adhesives for sealing of edges.

It should be mechanically tough enough to resist punctures, capable of being patched preferably when wet with water or electrolytes, and should be of comparatively low cost, say no more than $50/m$^2$.

Prior to the present invention, no antipercolation coating known to us has been able to satisfy all of these requirements.

For example, the antipercolation coating of U.S. Pat. No. 4,614,575 is a hydrogel which is applied to the catalyzed carbon cloth as a viscous solution which may be cross-linked into an immobile gel over a period of time.

The hydrogel was not fully satisfactory because it expanded excessively on hydration/dehydration and did not allow for successful edge-sealing with or without adhesives. Furthermore, fiber bundles could penetrate from the carbon cloth through the coating, which was applied in a liquid state, and these carbon fibers were capable of carrying sufficient hydrogen to cause unacceptable leakage of hydrogen during use.

The perfluorinated sulfonic acid membrane marketed under the trade name Nafion by DuPont has been proposed as an antipercolation layer for gas-diffusion electrodes but, at a cost of $700 per m$^2$, it is too expensive for use in many applications. Bonded asbestos has also been used in the past as demonstrated in U.S. Pat. No. 4,435,267. Conventional adhesives do not bond well to either of these materials and thus they are unsuitable for immersed-tank applications where adhesive-bonded seals are required.

OBJECTS OF THE INVENTION

It is, therefore, the principal object of the present invention to provide an improved gas-diffusion electrode structure utilizing an antipercolation coating which has all of the desiderata set forth above and is free from the drawbacks of the specific prior art systems described.

It is also an object of our invention to provide an improved method of making the gas-diffusion electrode and, especially applying the antipercolation layer thereto, so that substantial gas leakage will not occur.

Still another object of the invention is to provide an improved gas diffusion electrode, and a method of making same or of applying an antipercolation coating thereto, whereby disadvantages of earlier systems are obviated.

SUMMARY OF THE INVENTION

These objects are attained, in accordance with the invention, by bonding a preformed or free standing membrane to the catalyzed carbon cloth or other gas supplying support of the gas diffusion electrode by an adhesive which consists of filled polysulfone in an organic solvent, especially N-methylpyrrolidinone (N-MP). The adhesive is developed prior to application of the free-standing film or after the application thereof to the coating of the adhesive on the catalyzed carbon cloth, with water to effect a solvent exchange.

More particularly, a gas diffusion electrode according to the invention will comprise:

a gas-permeable body;

a catalyst layer on the gas permeable body;

a preformed microporous film on the catalyst layer and forming an antipercolation barrier; and a microporous polysulfone adhesive layer bonding the film to the catalyst layer.

The method of making that electrode can comprise the steps of:

(a) applying to a catalyst layer on a gas-permeable body for a gas-diffusion electrode, a microporous polysulfone adhesive layer; and (b) laminating to the catalyst layer on the gas-permeable body a preformed microporous film by bonding the same with the adhesive layer, thereby forming an antipercolation barrier preventing gas leakage as the gas is pressurized to offset the hydraulic head of the electrolyte in contact with the electrode.

More specifically it has been found that a solution of polysulfone in N-methylpyrrolidinone (1-methyl-2-pyrrolidinone) can be applied to both the carbon cloth itself and to catalyzed layers on carbon cloth with excellent flow characteristics and penetration characteristics. When developed with water, exchanging out the N-MP, a coating is created that has a microporosity sufficient to allow for acceptable ionic conductivity when wetted and filled with electrolyte.

It has been found to be advantageous to add an absorptive material to the polysulfone/NMP solution to remain as a filler in the adhesive. The filler may be used in an amount of 5 to 60 weight of the dry polysulfone composite and can be a high surface area silica, alumina, zinc oxide or carbon. Best results are obtained with carbon.

Additives which improve flow characteristics and wetting of the materials to which the adhesive may be applied can also be provided. A perfect additive for this purpose is polyvinyl-pyrrolidone.

A carbon/polysulfone adhesive layer will soften and flow at a temperature between 160° to 200° C., at which lamination is effected and preferably 170° to 190° C., depending upon its composition. This can be determined by assessing thickness change as a function of temperature at a constant pressure applied to the film.

The free-standing film which is applied can be a polysulfone film or a polypropylene film. In general the film can be a microporous polymeric film of polyethylene, polypropylene, polyphenylene sulfide, Nylon, a thermoplastic polyamide, polyester, polysulfone or polyvinylidene fluoride. Advantageously, the film, a polypropylene film with a total porosity of between 25% and 75% has an average pore size of 0.025 to 2.5 microns. Films of the type marketed as Celgard films by Hoechst-Celanese and preferably Celgard 4410, 4525, or 4510 are used; these have thermally bonded nonwoven webbing attached. The latter have a porosity of 45% and an average pore size of 0.075 microns.

When a polysulfone film is utilized, it can be made by casting a carbon-filled polysulfone from N-MP solution and developing this film by solvent exchange with water, further washing and air drying.

According to the invention, in a first aspect thereof, the film is cast by the steps of:

(a) spreading a dispersion of carbon in a polysulfone/N-MP solution onto a flat glass plate via a doctor blade;

(b) placing the glass plate covered by the layer into a tank of water to exchange out the N-MP solvent and form a free-standing strong film;

(c) removing the film from the glass plate to which it is nonadherent and drying the film in air;

(d) inspecting the film for pin holes and wrinkles.

The film is then applied to a gas diffusion electrode, e.g. of either of the types described in the aforementioned patent instead of the hydrogel antipercolation coating, by the following steps:

(e) catalyzing one side of a carbon cloth with a catalyzed carbon-fluorocarbon dispersion to provide a catalyzed carbon cloth of the type described in these patents;

(f) spreading carbon-filled polysulfone PVP and N-MP uniformly onto the catalyzed cloth with a doctor blade;

(g) developing the coated catalyzed cloth in water by exchanging out the N-MP as previously described;

(h) drying the coated catalyzed cloth in air and removing stresses by flexing the cloth to crack the carbon/polysulfone layer;

(i) placing the free-standing carbon-polysulfone film on top of the coating on the catalyzed cloth and inserting the assembly or laminate in a vacuum bag;

(j) evacuating the vacuum bag and heating the assembly at the aforementioned temperature to 160° to 200° C. in an oven;

(k) bonding the free-standing film to the cloth by heating at this temperature so that the adhesive will flow at substantially atmospheric pressure; and (l) lamination to an epoxy primed lead substrate for use in the manufacture of an electrode for immersed-tank operation (U.S. Pat. No. 5,047,133) or mounting in a plate and frame structure for an electrochemical cell.

The high surface area carbon constituting the filler is important to prevent pore collapse in the polysulfone during the thermal bonding. Pore collapse would degrade electrochemical performance of the gas diffusion electrode.

In a second approach, commercially available Celgard microporous polypropylene was laminated to the gas diffusion electrode utilizing the polysulfone adhesive layer.

The Celgard films are microporous polypropylene having a pore size around 0.025 to 0.075 microns and a thickness of 1 to 2 mils. Porosities of 38% and 45% are available, and the material can be applied with or without a nonwoven backing material which is applied for strength in some of the Celgard films. The overall thickness is 3 to 7 mils depending on the backing material used. The material is pin-hole-free and has no wrinkles as supplied. Although nonwettable, the film can be wetted by application of surfactants thereto.

According to a feature of the invention, a thermally bondable nonwoven polypropylene web is applied between the Celgard microporous polypropylene and the solution of polysulfone in N-MP, this web being thermally laminated to the Celgard film prior to application thereof to the adhesive.

In this embodiment of the invention, the gas diffusion electrode is made as follows:

(a) One side of a carbon cloth is catalyzed with a catalyzed carbon/fluorocarbon dispersion. The cloth is dried and sintered.

(b) The dispersion of carbon in polysulfone, PVP and N-MP is spread uniformly onto the catalyst layer of the cloth with a doctor blade.

(c) The Celgard microporous membrane is applied with its nonwoven mat backing contacting the polysulfone/N-MP adhesive and air bubbles are removed by rolling of the laminate. The mat is thermally bonded to the polypropylene membrane by the manufacturer.

(d) The laminate is immersed in water in a tank for developing of the polysulfone, exchanging out the N-MP to leave a microporous polysulfone structure as the adhesive layer.

(e) The cloth-polysulfone/Celgard laminate is dried in air at ambient temperature.

(f) The laminate is applied to an epoxy primed lead substrate for use in the manufacture of an electrode for immersed-tank operation (U.S. Pat. No. 5,047,133) or mounted in a plate and frame structure for an electrochemical cell.

(g) The electrode surface is made wettable by treatment with a surfactant capable of wetting Celgard, e.g. Triton X-100 from Rohm and Haas.

The use of a hydrophobic membrane like the Celgard slows the development time of the polysulfone adhesive layer allowing more time for solution migration into the carbon fibers and providing a greater ionically-conductive interface between the microporous film and the catalyst layer.

As examples of the results obtained with the antipercolation coatings described, it is noted that samples of coated electrode material were leak-tight to nitrogen gas at 4 to 6 PSI in the case of the thermal lamination of the free-standing carbon/polysulfone layer and 10 to 15 PSI when the lamination included a film of Celgard 4510 or 4525, with a nonwoven webbing that the adhesive layer penetrates into.

Immersed tank electrodes of 0.6 m in width and 1.0 m in depth were fabricated using both approaches and both gave leak-tight performances with either top to bottom or bottom to top flows of hydrogen equivalent to 90% utilization at 1000 A/m$^2$ current density.

Electrochemical polarization under zinc electrowinning conditions (150 g/l sulfuric acid, 60 g/l zinc, 40° C., 500 A/m$^2$) averaged 50 to 125 mV.

The electrodes utilizing Celgard prove to be especially resistant to mechanical damage and were readily sealed because of a minimum of expansion and contraction upon wetting and drying. Punctures of the coating could be sealed by acrylic adhesive on a Teflon film tape with the patches capable of withstanding many thousands of hours of service in sulfuric acid at 40° C.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
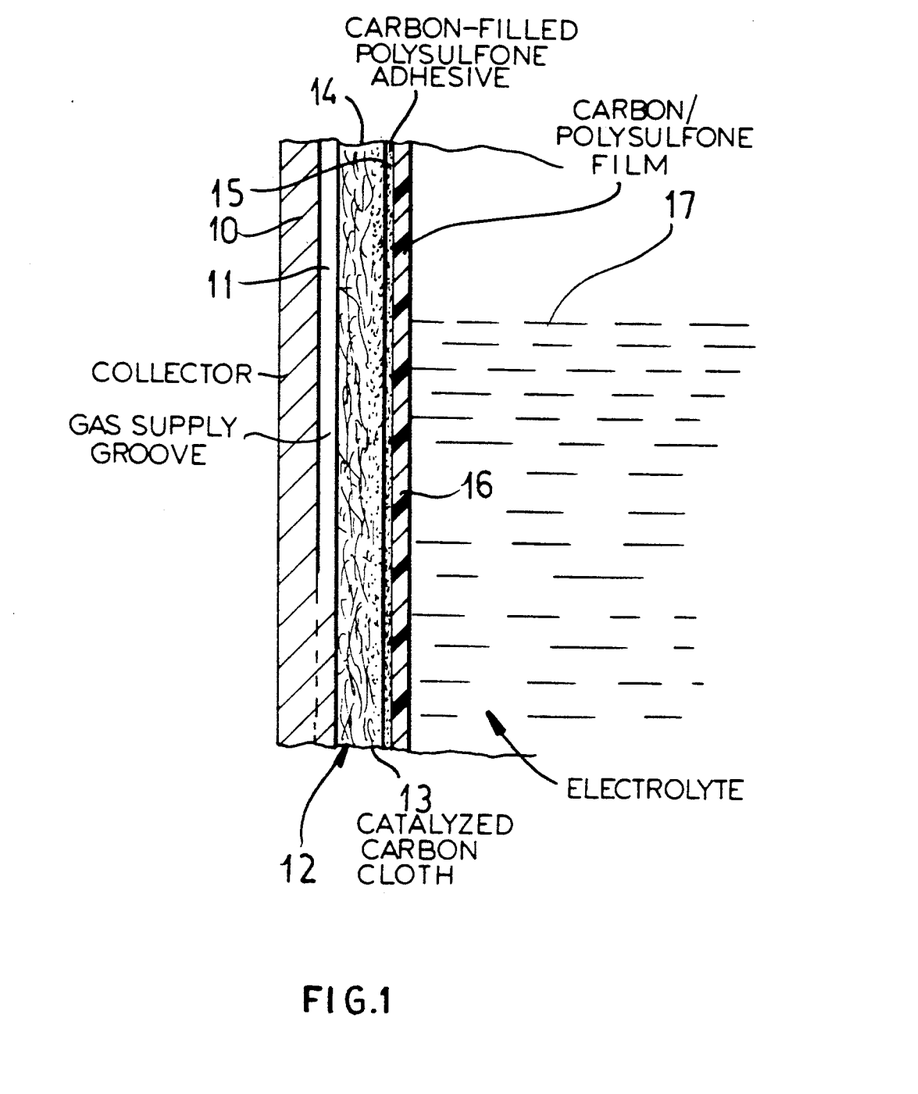
FIG. 1 is a diagrammatic cross sectional view of a gas diffusion electrode of the type shown in U.S. Pat. No. 5,047,133 which does not utilize a gas plenum, but rather has a gas distribution effected through the carbon cloth body, and provided with the antipercolation films of the present invention.

In FIG. 1, we have shown a gas diffusion electrode 10 according to the invention which is formed with a collector 10 as described in U.S. Pat. No. 5,047,133 and having a gas supply groove 11 opening directly against the gas-permeable body 12 which comprises a catalyzed carbon cloth 13, the catalyst layer of which is formed at the right-hand side of the cloth at 14 and against which a carbon-filled polysulfone adhesive is applied at 15 to allow lamination of a polysulfone film 16 or a Celgard membrane to the catalyzed side of the carbon cloth to act as an antipercolation layer with respect to gas and electrolyte 17 in contact with the electrode.

Except for the antipercolation film 16 which may be a carbon-filled polysulfone film produced as detailed above, or a Celgard film which is commercially available, and the polysulfone adhesive which also contains a filler and partly penetrates into the catalytic layer and the free-standing polysulfone or Celgard film, the gas diffusion electrode of FIG. 1 can correspond to that of U.S. Pat. No. 5,047,133.

Figure 2:
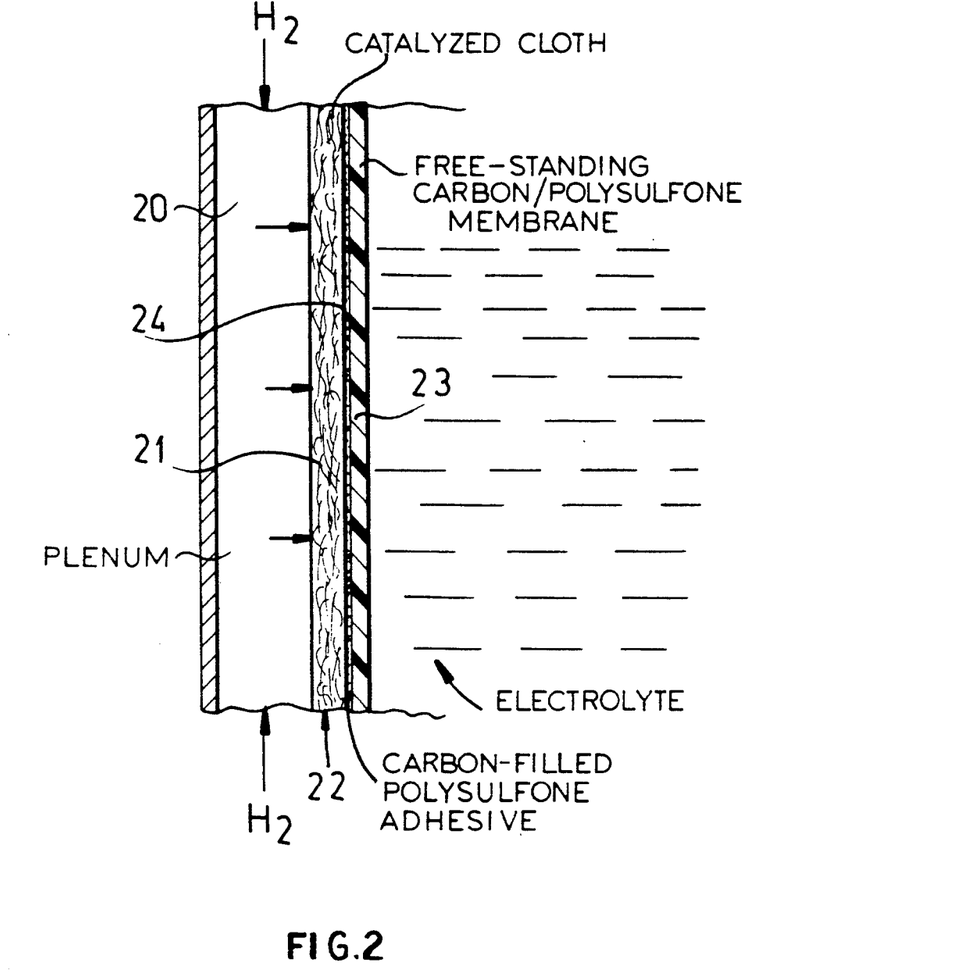
FIG. 2 is a diagrammatic cross section of an electrode provided with a gas plenum and also formed with the antipercolation coating of the invention.

The electrode of FIG. 2 differs from that of FIG. 1 in the sense that, as described in U.S. Pat. No. 4,614,575, a plenum 20 is provided which can be supplied with gas, e.g. hydrogen, and is closed at the electrolyte side of the cell by a carbon-cloth layer 21 which may be catalyzed by a catalytic layer represented at 22 and is, in turn, covered by an antipercolation layer 23. The antipercolation layer is made up of a free-standing carbon-filled polysulfone film or a Celgard membrane as described and as shown at 23, laminated to the carbon cloth via an adhesive layer 24 in the form of a filled polysulfone adhesive produced by developing a solvent-applied polysulfone composition in the manner described.

Figure 3:
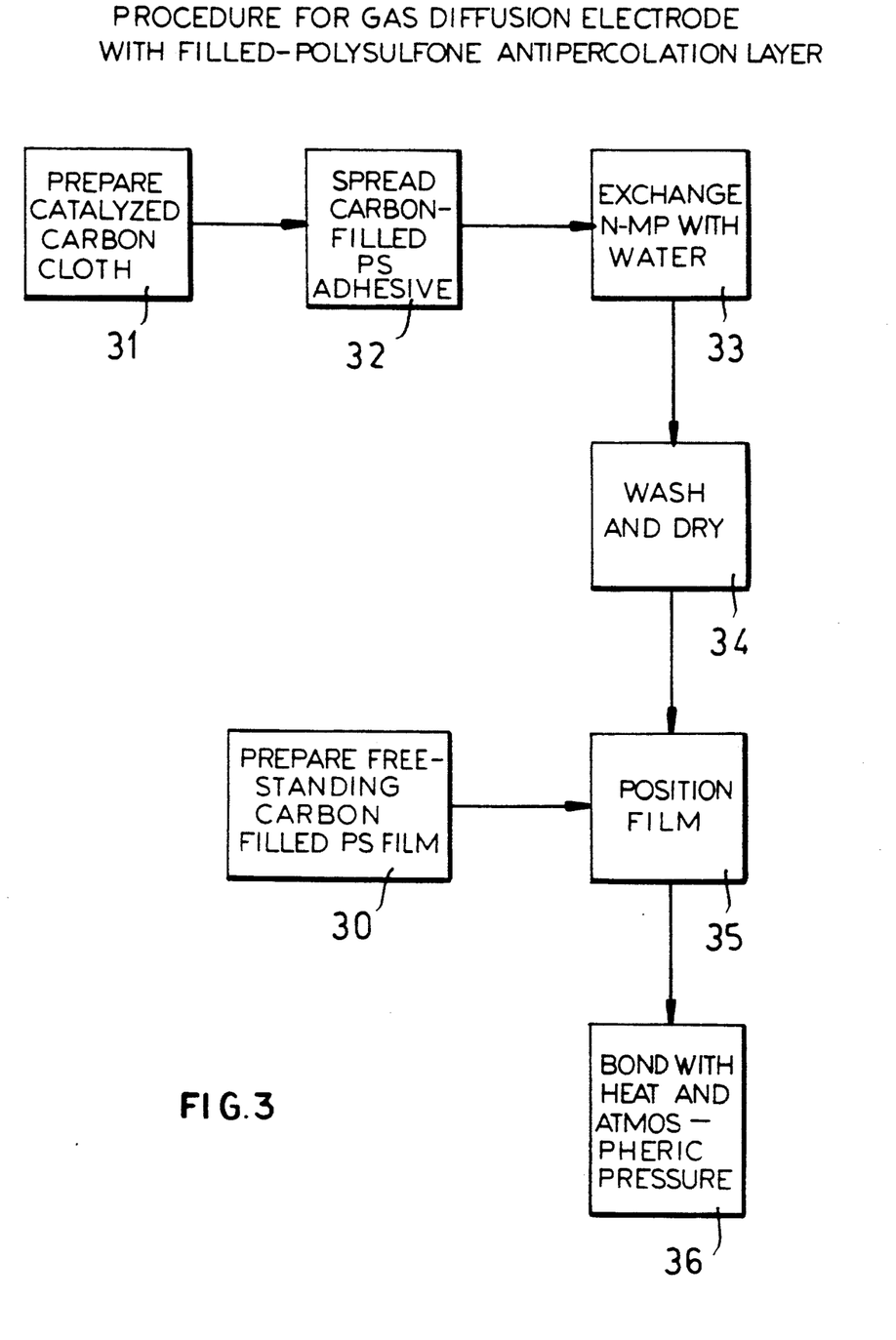
FIG. 3 is a block diagram illustrating one embodiment of the method of the invention, a second embodiment utilizing certain of the steps of this method as well.

The basic steps of the process of the invention, therefore, are represented in FIG. 3 and can include preparation of the free-standing film at 30 and preparation of the catalyzed carbon cloth body at 31, and to which the carbon-filled polysulfone adhesive in N-MP is applied at 32. Following this step, the N-MP is exchanged for water at 33 and the adhesive is dried at 34.

The film can then be applied and after evacuation of the vessel in which the laminate is to be effected, heat and pressure may be applied, for example, the lamination can be evacuated at a temperature between 160° and 200° C. under atmospheric pressure. The film application step is represented at 35 and the final lamination step at 36 in FIG. 3.

Figure 4:
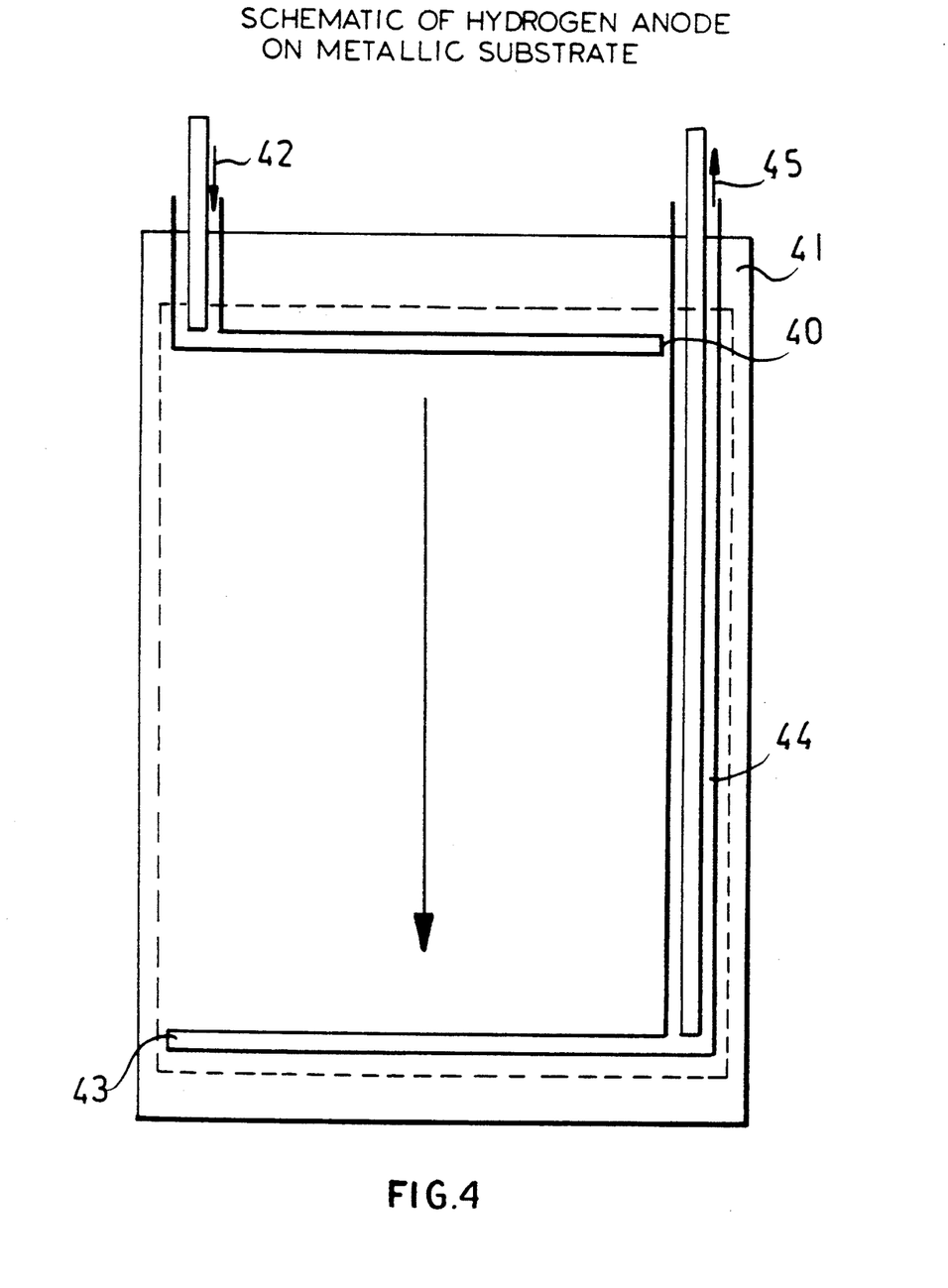
FIG. 4 is a schematic diagram of a hydrogen anode on a metallic substrate as used in accordance with the invention and based, for example, upon the teachings of U.S. Pat. No. 5,047,133.

The electrode shown in FIG. 4 has a groove 40 at the top of the lead plate 41 to which the hydrogen is supplied at 42, and another groove 43 at the lower side of the plate from which gas is carried away via a channel 44 as represented by the arrow 45. The principles of such an electrode are set out in U.S. Pat. No. 5,047,133.

EXAMPLE 1

A 0.6×1.0 meter electrode was prepared for trials in a zinc electrowinning facility. The electrode was prepared on a lead substrate which was machined with top and bottom grooving as shown in FIG. 4. The lead was sanded and spray painted with an electrically conducting epoxy to seal its surface from air oxidation during fabrication and to later prevent corrosion by sulfuric acid during use. Tubing for carrying hydrogen was epoxied into the vertical channels in the lead substrate. Please refer to FIG. 4 which depicts the placement of the tubing.

A free-standing film for lamination to the catalyzed carbon cloth was prepared. The free-standing film was a casting of polysulfone filled with carbon from a PVP and N-MP solution prepared by a doctor blade technique on a glass plate. The casting solution had the following composition:

| N-MP | 81.0 wt. % |
|---|---|
| Polysulfone | 13.7 wt. % |
| Carbon | 3.3 wt. % |
| PVP | 2.0 wt. % |

After casting, the film was developed by passing the glass plate into water and exchanging out the N-MP for water. The film was washed thoroughly and dried in air.

The catalyzed carbon cloth was coated lightly with the casting solution by a doctor blade technique. The thin coating was developed by passing the cloth into a tank of water. The coating was washed thoroughly and dried in air. After drying, the coated cloth was flexed repeatedly to crack the coating and remove stresses that would otherwise keep the cloth from laying flat.

A laminate of catalyzed carbon cloth and the free-standing polysulfone film was fabricated by a vacuum pressing procedure within a vacuum bag, as previously described. A temperature of 193° C. was used for the lamination.

The application of the laminate to the prepared lead substrate was performed with carbon-filled conductive epoxy applied evenly to the substrate by a screen technique. A vacuum bag technique was used to press the laminate to the lead during curing of the epoxy. A temperature of 100° C. for one hour was used to cure the epoxy.

After the application of the laminate to the lead, the edges were sealed with an epoxy applied via a molding channel. The epoxy used was cured at room temperature. All exposed lead was painted with an acid-resistant acrylic spray to further protect the lead from corrosion.

The electrode was operated in a small tank supplied with a side-stream of electrolyte from a commercial zinc electrowinning tankhouse.

Figure 5:
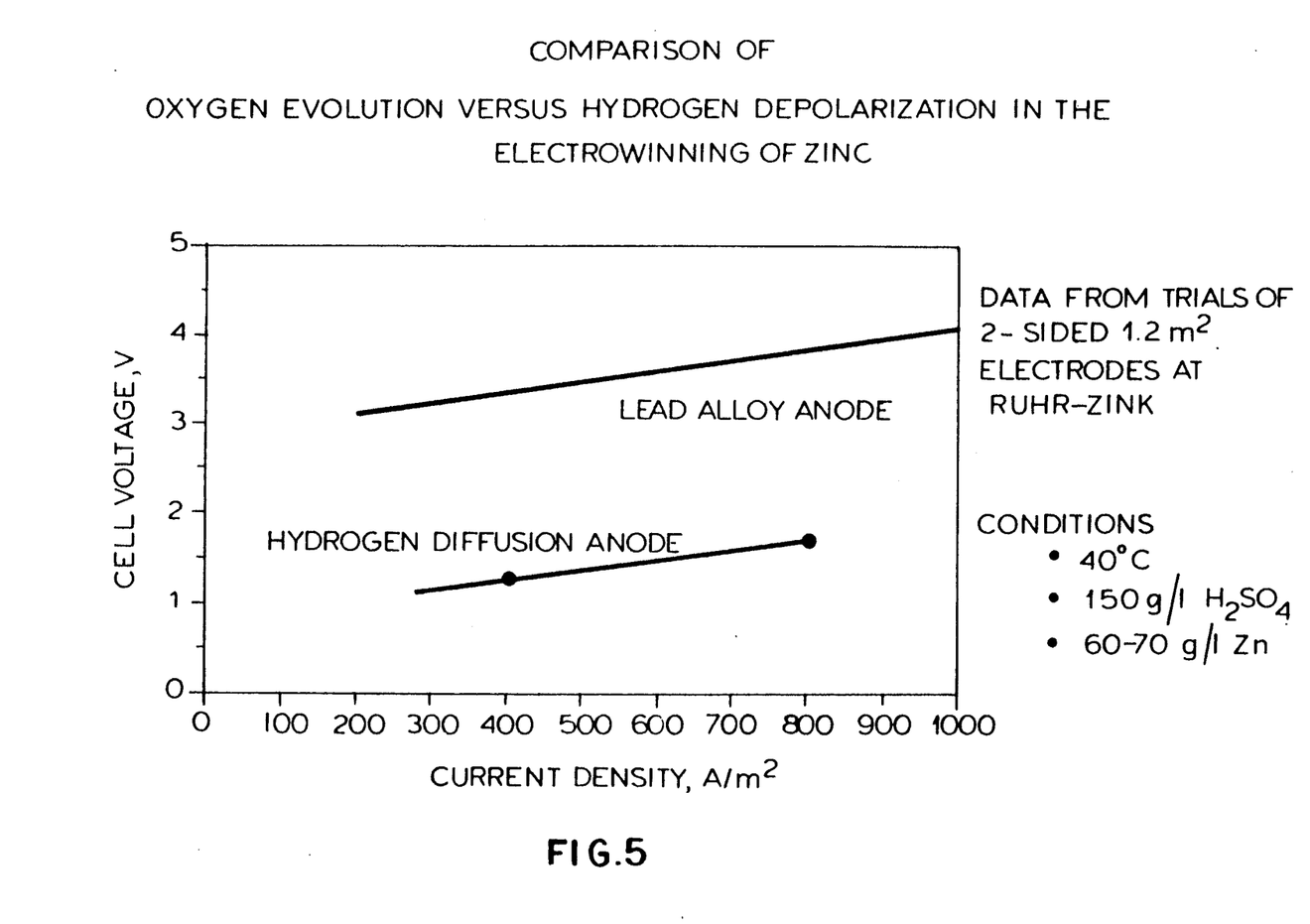
FIG. 5 is a graph illustrating the examples.

FIG. 5 shows the resulting polarization curve of the electrode as measured by an Hg/HgSO$_4$ reference electrode. Approximately 1.8 volts are saved at the typical current density for zinc electrowinning of 500 A/m$^2$ versus conventional electrowinning using oxygen evolving anodes. A current density of 1,000 A/m$^2$ (which is a requirement when a cathode is pulled to strip zinc) could be sustained without difficulty. The resulting zinc deposit was of even thickness, thus showing a uniform distribution of both hydrogen flow and current density.

EXAMPLE 2

In this case, an electrode was prepared using commercially available Celgard microporous polypropylene film as the antipercolation barrier.

A 0.6×1.0 meter lead substrate was prepared with grooving, a sealing layer of conductive epoxy paint, and feed tubing as in Example 1.

A Celgard film having a thermally bonded nonwoven backing web was attached to the catalyzed carbon cloth by means of the filled polysulfone adhesive of the same composition as that used in Example 1. The adhesive layer was spread with a doctor blade onto the catalyst later of the catalyzed cloth. The Celgard was rolled over the adhesive, and trapped air was worked out to the edges.

The N-MP solvent for the adhesive layer was exchanged out by passing the laminate into water. After washing and air drying a firmly bonded laminate was obtained after development.

The laminate of catalyzed carbon cloth and Celgard film was applied to the lead substrate by the conductive epoxy and vacuum pressing procedure described in Example 1.

As in Example 1, after lamination of the lead, the edges were sealed with an epoxy and a further protective coating was applied to any exposed lead.

The electrode was run in a small tank operated with a drum of electrolyte from a commercial zinc electrowinning tankhouse.

The data represented in FIG. 5 are essentially the same as were obtained for the Celgard lamination. Approximately 1.8 volts are saved at the optimal current density of 500 A/m$^2$ versus conventional electrowinning with oxygen evolving anodes.

Smaller (100 cm$^2$) active area electrodes of this construction have passed 6,000 hours of continuous operation in the laboratory without evidence of decay.

We claim:

1. A gas-diffusion electrode in contact with an electrolyte on one side of said electrode, comprising:
   a gas-permeable body;
   a catalyst layer on said gas-permeable body at said one side;
   a preformed microporous film on said catalyst layer at said one side and forming an antipercolation barrier preventing gas leakage under pressure and thus flooding of said body by an electrolyte in contact with said electrode, said film being selected from the group which consists of polyethylene, polypropylene, polyphenylene sulfide, polyamide, polyester, polysulfone and polyvinylidene fluoride films;
   a microporous polysulfone or polysulfone derivative adhesive layer at said one side bonding said film to said catalyst layer over the area of said film juxtaposed with said catalyst layer; and
   means for feeding a gas to said body on a side of said electrode opposite said one side.

2. The gas-diffusion electrode defined in claim 1 wherein said film is selected from the group which consists of polyethylene, polypropylene, polyphenylene sulfide, nylon, polyester, polysulfone and polyvinylidene fluoride films.

3. The gas-diffusion electrode defined in claim 1 wherein said adhesive contains an inert filler selected from the group which consists of silicas, aluminas, metal oxides, and carbons.

4. The gas-diffusion electrode defined in claim 1 wherein said film has a total porosity of 25 to 75%.

5. The gas-diffusion electrode defined in claim 1 wherein said film has an average pore size of 0.025 to 2.5 microns.

6. The gas-diffusion electrode defined in claim 1 wherein said body is composed of carbon cloth having said catalyst layer on one side thereof.

7. The gas-diffusion electrode defined in claim 6 wherein said film is applied to said side of said carbon cloth.

8. The gas-diffusion electrode defined in claim 6 wherein said preformed microporous film is applied to an opposite side of said carbon cloth.

9. A method of making a gas-diffusion electrode with a microporous antipercolation coating, comprising the steps of:
   (a) applying to a catalyst layer on a gas-permeable body for a gas-diffusion electrode, a microporous polysulfone adhesive layer; and
   (b) laminating to said catalyst layer on said gas-permeable body a preformed microporous film by bonding same with said adhesive layer over the area of said film juxtaposed with said catalyst layer, thereby forming an antipercolation barrier preventing gas leakage under pressure and preventing flooding of said body by an electrolyte in contact with said electrode, said film selected from the group which consists of polyethylene, polypropylene, polyphenylene sulfide, polyamide, polyester, polysulfone and polyvinylidene fluoride films, a coating of polysulfone or polysulfone derivative adhesive in an organic solvent applied to said body and being developed by a solvent exchange thereon to form said adhesive layer.

10. The method defined in claim 9 wherein said organic solvent is N-methyl-pyrrolidinone and the solvent exchange is effected with water.

11. The method defined in claim 9 wherein the solvent exchange is effected prior to application of said film to said coating.

12. The method defined in claim 9 wherein the solvent exchange is effected subsequent to application of said film to said coating for development of the electrode body/polysulfone adhesive/film lamination by said solvent exchange.

13. The method defined in claim 9 wherein said adhesive contains an inert filler selected from the group which consists of silicas, aluminas.

14. The method defined in claim 13 wherein said filler is present in said adhesive in an amount of 2–75 weight % of the dried polysulfone.

15. The method defined in claim 9 wherein said film is a free-standing polysulfone film formed by solution casting a polysulfone containing an inorganic or carbon filler and drying the cast film.

16. The method defined in claim 9 wherein said film has a total porosity of 25 to 75%.

17. The method defined in claim 9 wherein said film has an average pore size of 0.025 to 2.5 microns.

18. The method defined in claim 9 wherein said body is composed of carbon cloth having said catalyst layer on one side thereof.

19. The method defined in claim 18 wherein said film is applied to said side of said carbon cloth.

20. The method defined in claim 18 wherein said preformed microporous film is applied to an opposite side of said carbon cloth.

21. The method defined in claim 9 wherein the lamination is effected at a temperature of 160° to 200° C. with an applied pressure of atmospheric pressure.

22. The method defined in claim 9, further comprising the step of wetting a surface of said film with a wetting agent.

* * * * *